Fig. 3a

United States Patent Office 3,027,783
Patented Apr. 3, 1962

3,027,783
BALANCED INERTIA STEP RATIO TRANSMISSIONS
Oliver K. Kelley, Bloomfield Hills, Mich., assignor to General Motors Corporation, Detroit, Mich., a corporation of Delaware
Filed Jan. 16, 1956, Ser. No. 559,295
9 Claims. (Cl. 74—752)

This invention relates to automatic step ratio transmissions and more particularly to balanced inertia step ratio transmissions.

The present invention constitutes an improvement over the transmission described and claimed in the copending application of Oliver K. Kelley et al., S.N. 504,992, filed April 29, 1955 for Balanced Inertia Plural Step-Ratio Transmission. In the aforesaid application disclosure has been made of a step ratio transmission in which an inertia mass is associated with a part of the gearing in such fashion that when a change in gear ratio occurs in the transmission the inertia of the accelerated masses is substantially balanced by the inertia of the decelerated masses. The present invention employs the same principle of operation with modifications and in order that the size and weight of the inertia mass employed for balancing purposes can be reduced, provision is made for driving the same at a higher speed than the speed of rotation of the parts with which the inertia mass rotates.

An object of the present invention is to provide a step ratio transmission having associated therewith an inertia mass which when rotating is driven at a faster speed of rotation than the parts to which it adds inertia.

Another object of the invention is to provide a transmission as just described in which provision is made for driving an inertia mass at a relatively high speed of rotation and for locking the same against rotation for the establishment of different gear ratios in the overall transmission.

Another object of the invention is to provide inertia mass connected to the sun gear of a planetary gear unit in which unit the ring gear is permanently locked against rotation and drive of the unit is through the carrier with the carrier being driven by a gear element of another planetary gear unit.

Another object of the invention is to provide hydraulic controls for the transmission, which controls include a throttle valve operated from a remote agency, such as an accelerator pedal or the like, through a substantially closed column of fluid, which column serves to actuate a pressure regulating valve in accordance with throttle position.

A further object of the invention is to provide arrangements for cooling the friction elements of friction engaging devices, such as clutches and brakes, during the application of such devices.

A still further object of the invention is to provide controls for such cooling arrangement whereby cooling liquid is supplied to the friction engaging devices during the application thereof in such quantity as to cool the friction elements and in which supply of fluid for cooling purposes is arrested when the same is not needed.

In carrying out the foregoing and other objects of the invention, the transmission of the present arrangement comprises two forward drive planetary gear units and a reverse drive planetary gear unit which can be conditioned to drive the output shaft in reverse direction by way of the two forward drive planetary units. The first forward drive planetary unit has the carrier thereof driven by a source of motive power such as a gas turbine engine, an internal combustion engine, or other vehicle driving device. The ring gear of this first planetary gear unit serves to drive the pump of a fluid coupling, the turbine of which is connected to drive the sun gear of a second forward drive planetary gear unit. The sun gear of the first unit is connected to drive the carrier of an inertia mass gear unit which unit has the ring gear thereof permanently locked against rotation and which has the sun gear thereof connected to a suitable inertia mass. The sun gear of the first forward drive unit can be locked against rotation in either direction by a hydraulically actuated brake and can also be clutched to the ring gear of the second forward drive planetary unit, which ring gear in turn can be locked against rotation by a hydraulically applied brake, or can be clutched to rotate in unison with the ring gear of the first forward drive planetary gear unit. The condition of the connection between the sun gear of the first unit and the ring gear of the second unit also determines the condition of the inertia planetary unit but in addition this inertia planetary unit can be locked against rotation by the same brake that locks the sun gear of the first unit against rotation. The carrier of the second forward drive unit is connected to the output shaft of the transmission to which is also connected the carrier of a reverse drive planetary unit. This reverse drive unit has the sun gear thereof connected to rotate in unison with the ring gear of the second forward drive unit and the ring gear of the reverse unit can be locked against rotation by a hydraulically applied brake.

In the hydraulic controls for the automatic operation of this transmission, provision is made for the production of a so-called throttle valve pressure, i.e., a hydraulic pressure which varies in proportion to the throttle position of the mechanism controlling the engine providing drive for the vehicle in which the transmission is installed. Inasmuch as the accelerator pedal, or the like, for the engines throttle is usually remote from the transmission, the present invention provides a novel arrangement for operating the throttle valve in the transmission. This arrangement consists of a closed column of liquid which is moved in response to accelerator pedal movement to apply a variable tension on the regulating valve developing pressure in the transmission in accordance with throttle position. Provision is made for assuring the maintenance of a full column of fluid for this purpose and other novel features associated therewith will be evident from the description of the control circuit to be made in detail later. Shift valves for determining the gear ratio at which the transmission operates are provided and such shift valves are under the joint control of pressure from the throttle valve and from a governor which is driven by the output shaft of the transmission and which operates to deliver two metered hydraulic pressures which vary with variation in output shaft speed. Inasmuch as friction engaging devices, such as disk clutches, generate considerable heat when the friction elements thereof are pressed together, provision is made for cooling such friction elements by the supply of liquid to the hubs of the elements, which liquid can pass between the friction elements and be discharged therefrom due to centrifugal force or due to pressure of the applied fluid. This arrangement is of particular utility in connection with the friction engaging element which serves both as a clutch and as a brake for the sun gear of the first unit and for the clutch which causes the ring gear of the second unit to rotate in unison with the ring gear of the first unit. Inasmuch as the demands for cooling are of intermittent character and may require a quantity of fluid in excess of the instantaneous capacity of a pump supplying fluid to the transmission, accumulators are included which serve to store a considerable quantity of fluid for immediate release when cooling is desired. Automatically operating valves controlling this supply of cooling fluid are included with operation thereof coordinated with shift valve operation.

Other features, objects and advantages of the invention will become apparent by reference to the following detailed description of the accompanying drawings wherein.

Figure 1:
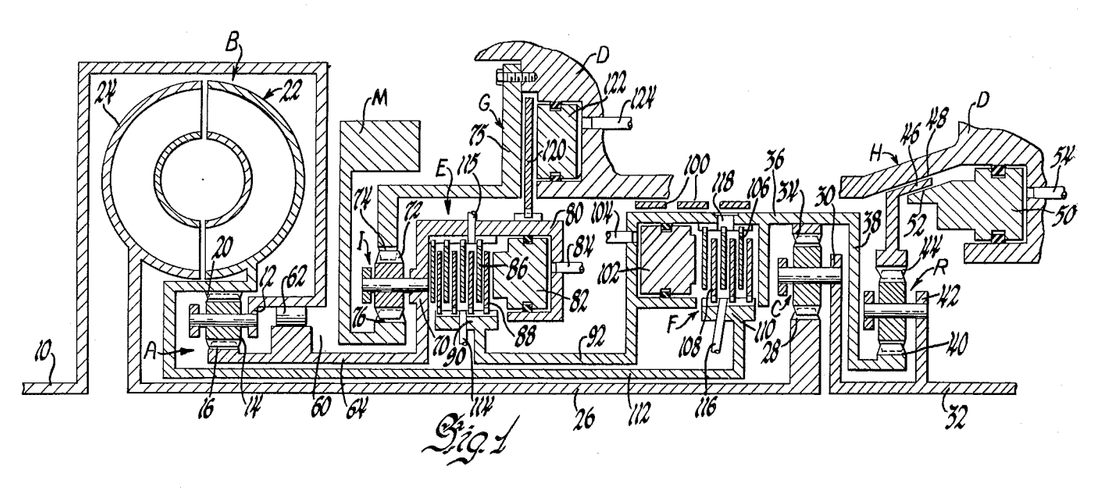
FIGURE 1 is a diagrammatic illustration of the operating mechanism of the invention including the fluid coupling and the planetary gear units.

Referring to FIGURE 1, 10 indicates the input of the transmission and such input may be driven directly or through gearing by a gas turbine or other engine for a vehicle. The input 10 is connected to drive the carrier 12 of a front planetary gear unit indicated generally at A. The carrier 12 rotatably supports pinions 14 which mesh with a sun gear 16 and a ring gear 20. The ring gear 20 is connected to drive the bladed pump 22 of a fluid coupling indicated generally at B, which fluid coupling in addition to the pump 22 has a bladed turbine 24. Turbine 24 is connected to an intermediate shaft 26 extending to a sun gear 28 of a second planetary gear unit indicated generally at C. The carrier 30 of this second unit is connected to the output shaft 32 of the transmission and the ring gear 34 is connected to a drum 36. In addition, the ring gear 34 is connected by member 38 to the sun gear 40 of the reverse planetary gear unit indicated generally at R. The carrier 42 of the gear unit R is also connected to the output shaft 32. Ring gear 44 of reverse unit R has a conical shaped extension 46 which can be pressed against a conical formation 48 of the transmission housing D by a piston 50, fluid actuated to cause a surface 52 thereof to engage the formation 46 and force it against the conical surface 48. Fluid for such action by the piston 50 can be supplied by the conduit 54.

Various friction engaging devices are associated with the two gear units A and C. The sun gear 16 of the gear unit A has associated therewith a one-way mechanism indicated generally at 60, which one-way mechanism includes one-way devices 62 between a formation on the intermediate shaft 64 connected to the sun gear and a part of the drive for the carrier 12. These elements 62 can be in the nature of rollers or sprags so arranged that the sun gear 16 cannot rotate faster than the carrier 12 but can be braked against rotation while the carrier is rotating. The intermediate shaft 64 extends from the sun gear 16 to the carrier 70 of an inertia planetary gear unit indicated generally at I. This gear unit I has pinions 72 supported by carrier 70 and a ring gear 74 which is locked against rotation in either direction by an extension 75 thereof which is bolted, or otherwise secured, to a part of the casing D. The remaining element of gear unit I comprises a sun gear 76 to which is attached a mass M. Connected to rotate with the carrier 70 is a drum formation 80 so shaped as to provide a cylinder for a piston 82 supplied with hydraulic pressure by a conduit 84. The position of piston 82 determines the condition of a friction engaging device or clutch E which has plates 86 splined to the interior of the drum 80 and plates 88 splined to a member 90 which in turn is connected by the part 92 to the drum 36 which carries the ring gear 34 of gear unit C.

Drum 36 can be braked against rotation by a multiwrap brake band 100 which can be hydraulically applied by a suitable servo device in a manner to be described in connection with the circuit diagram of the mechanism controls. Drum 36 is constructed to provide a cylinder in which is slidably mounted a piston 102 to which fluid under pressure can be supplied through conduit 104. The position of the piston 102 determines the condition of clutch F which has plates 106 splined to the interior of drum 36 and plates 108 splined to a member 110 which is connected by intermediate shaft 112 to the ring gear 20 of the first gear unit A.

Inasmuch as considerable heat is generated when the plates of the clutches E and F are forced together by the respective pistons 82 and 102, liquid for cooling the clutches can be supplied, which liquid can pass between the plates of the clutch to absorb the heat therefrom and to dissipate the same. For this purpose a conduit 114 supplies oil to the inner part of clutch E and oil which passes between the plates 86 and 88 can be discharged through conduit 115 or other suitable openings in the drum 80. It is to be understood that the plates 86 and 88 may have grooves in the surfaces thereof so that the oil can travel between the plates and extract heat therefrom even when the plates are in surface contact. For the same purpose a conduit 116 supplies oil or other fluid to the clutch F from which the heated oil can be exhausted through an opening 118 or several openings of like character in the drum 36.

The sun gear 16 of unit A and carrier 70 of unit I can be locked against rotation by brake G made up of a plate 120 which is splined to the exterior of the drum 80 and which can be held against the extension 75 by a piston 122 mounted in a cylinder formed in the casing D. Fluid under pressure to move the piston to engage the brake G is furnished through a conduit 124.

In neutral all of the friction engaging devices, that is, the clutches E and F and the brakes D and G, are released. Drive by the input in this condition drives the carrier 12 of the gear unit A. The sun gear 16 and the ring gear 20 offer mutual reaction so that of these two gears the one with the lightest load thereon will be driven at overdrive or at least the normal tendency would be to drive this gear at overdrive. Sun gear 16 has the inertia of the mass M and other parts connected thereto to serve as reaction while the ring gear 20 has the coupling B and the intermediate shaft 26 and sun gear 28 of rear unit C as inertia. If the inertia of the mass M and the parts connected to the sun gear 16 is greater than the inertia of the parts connected to the ring gear 20, this ring gear will be driven at overdrive which overdrive will be communicated to the sun gear 28. With the drum 36 released and with a load on the output shaft 32, the ring gear 34 will be rotated freely and torque will not be transmitted to the output shaft. If the inertia of the parts connected to or rotating with the ring gear 20 is great enough, the sun gear 16 will be driven forward but cannot be driven at overdrive due to the one-way clutch 60. When the speed of rotation of the sun gear is the same as that of the carrier 12, the one-way clutch 60 locks and the gear set is then in direct drive but still torque is not transmitted to the output shaft 32.

For first, or lowest, speed ratio, the brake band 100 is applied to lock drum 36 and ring gear 34 against rotation. This conditions the gear unit C for reduction drive and places the load of the output shaft 32 on the turbine 24 of coupling B. The resistance to rotation of the turbine 24 is imparted to the pump 22 to supply the reaction necessary for causing the gear unit A to rotate in direct drive. When the speed of rotation of pump 22 of coupling B is high enough, drive is imparted to the sun gear 28 and thence to the output shaft 32 at a reduced speed ratio.

Second speed ratio is obtained by engaging the clutch E while the band 100 is still applied to lock drum 36 against rotation. Engagement of clutch E locks sun gear 16 to the drum 36 so that this sun gear 16 is held against rotation and likewise the carrier 70 of gear unit I is held against rotation. This causes gear unit A to operate in overdrive which accelerates the rotation of ring gear 20 and coupling pump 22. Drive by the coupling is communicated to the sun gear 28 of the gear unit C so that the output shaft 32 is driven at a reduced speed ratio, which speed ratio, however, is different from that in first speed ratio due to overdrive in the unit A.

Third speed ratio is accomplished by timed release of brake 100 and engagement of clutch F. Completion of the engagement of clutch F compels the sun gear 16 and ring gear 20 to rotate at the same speed due to their being clutched together so that front unit A is again in direct drive while the rear unit C is in substantially direct drive caused by the split torque arrangement wherein the ring gear 34 is driven at the same speed as the front unit A while sun gear 28 is driven at substantially the same speed by the coupling B with the disparity in speed being due to the inherent slip in the coupling.

Fourth speed ratio is obtained by the timed release of clutch E and application of brake G. Completion of this latter application locks the drum 80 against rotation and since this drum is in driving connection with the sun gear 16, it also is locked against rotation. Under these conditions the front unit A again is in overdrive ratio with the ring gear 20 rotating faster than the carrier 12 and with such increased speed of rotation being imparted through clutch F to the ring gear 34. The rear unit C remains in direct drive since sun gear 28 is driven by coupling B at substantially the same speed as the ring gear 20.

During operation of the transmission in first and third speed ratios, drive of the front unit A in direct drive causes the inertia mass 20 to be driven at an overdrive ratio through the agency of the gear unit I. Inasmuch as ring gear 74 of this gear unit is locked against rotation at all times, drive of the carrier 70 by sun gear 16 causes overdrive of sun gear 76 which is connected to the mass M. This mass M is so calculated that the addition thereof to the sun gear 16 and parts rotating therewith creates a total inertia of parts accelerating with the sun gear or decelerating therewith, which substantially balances the inertia of parts selectively connected to the sun gear or released therefrom. A more detailed description of this balancing action has been set forth in the copending application above-identified. It will be evident that since the mass M is driven at a higher speed than the sun gear 16, the weight and size thereof can be reduced materially without upsetting the balance of inertias so desirable in connection with this transmission.

Reverse drive through the transmission is accomplished by application of brake H which causes the ring gear 44 to be locked against rotation, due to movement of piston 50 forcing cone 46 against formation 48. Clutches E and F and brake G are released. With a load on the output shaft 32 the following occurs: the front unit A is driven in direct drive ratio as in first speed forward drive with the output thereof being transmitted to sun gear 28 of planetary unit C. The carrier 30 of this unit is held against rotation by the load on the output shaft so that ring gear 34 is caused to rotate in the reverse direction, which reverse rotation is transmitted to the sun gear 40 of the reverse planetary unit R. With ring gear 44 of this unit locked against rotation, drive of reverse unit R in this direction compels the carrier 42 and the output shaft 32 likewise to rotate in a reverse direction and such rotation is communicated to the carrier 30 of the rear unit C. Reverse drive therefore is the result of the compound ratios of the two units C and R with drive thereto being at direct drive from the front unit A.

Figure 2:
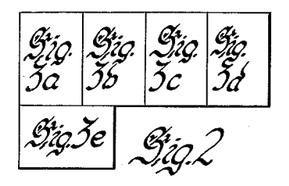
FIGURE 2 is a plan of the manner in which FIGURES 3a to 3e can be combined to comprise a complete hydraulic circuit diagram of the control mechanism for the invention.
Figure 3A:
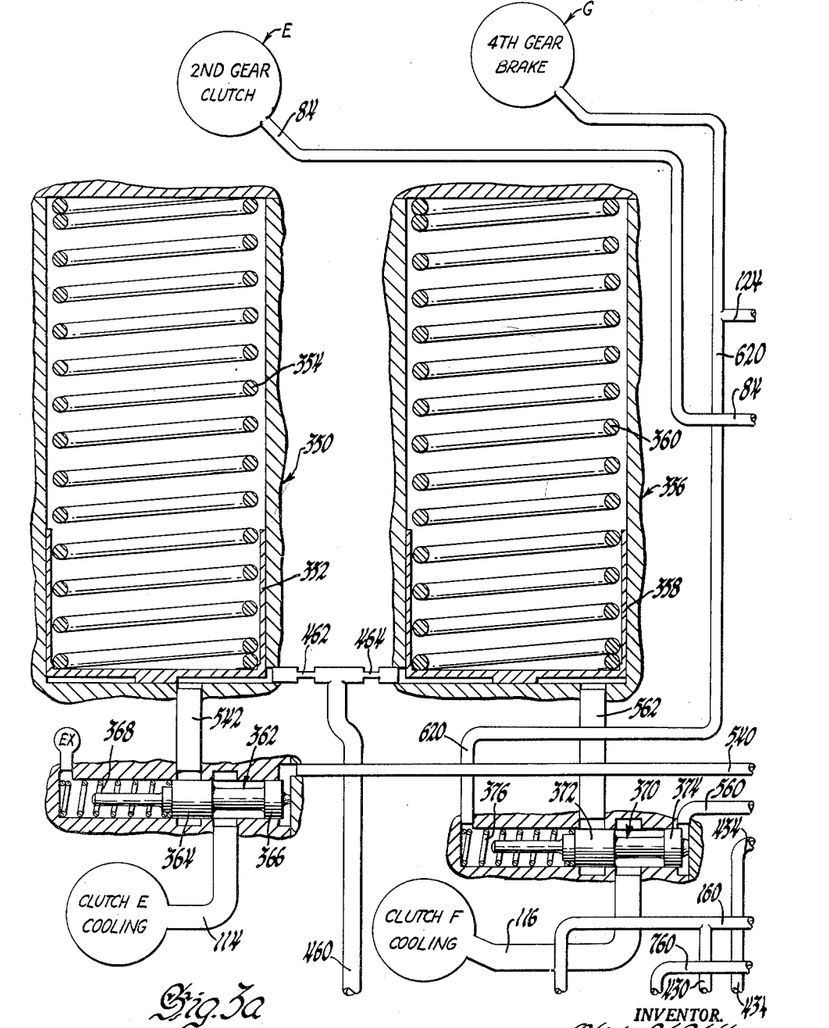
Figure 3B:
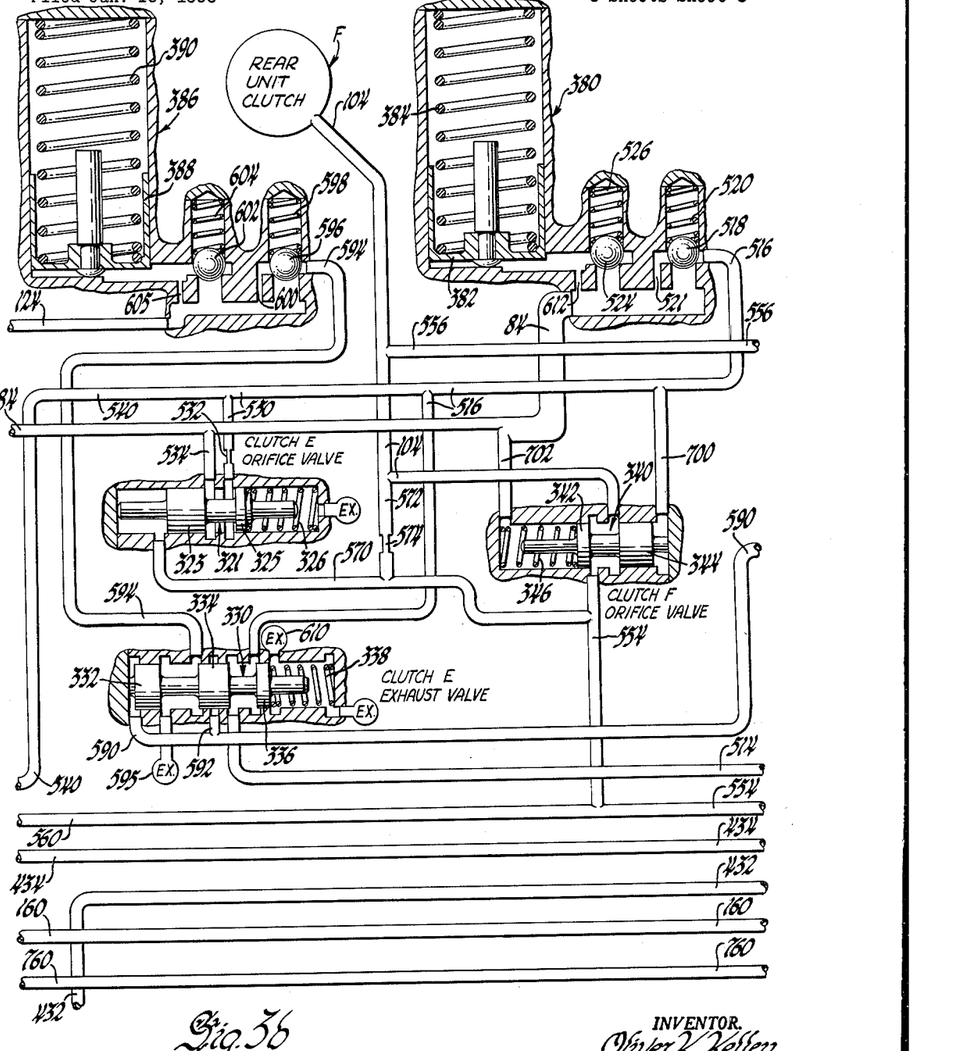
Figure 3D:
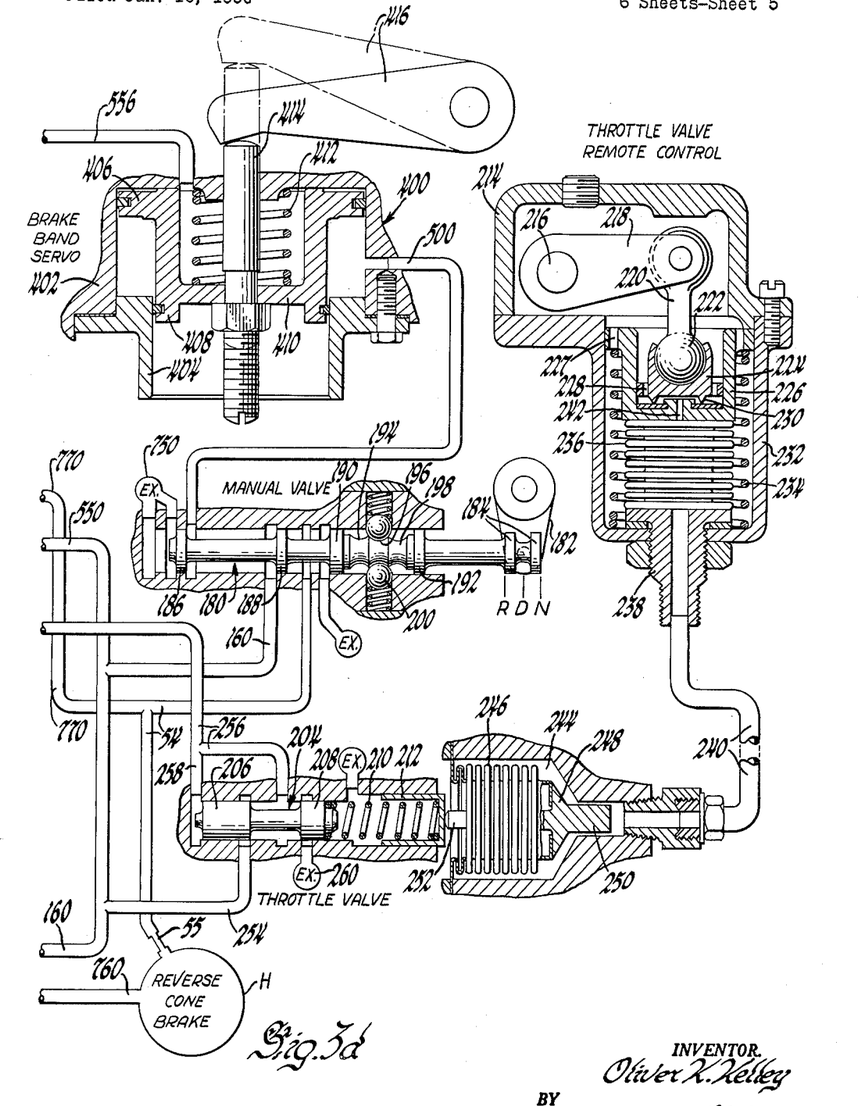
Figure 3E:
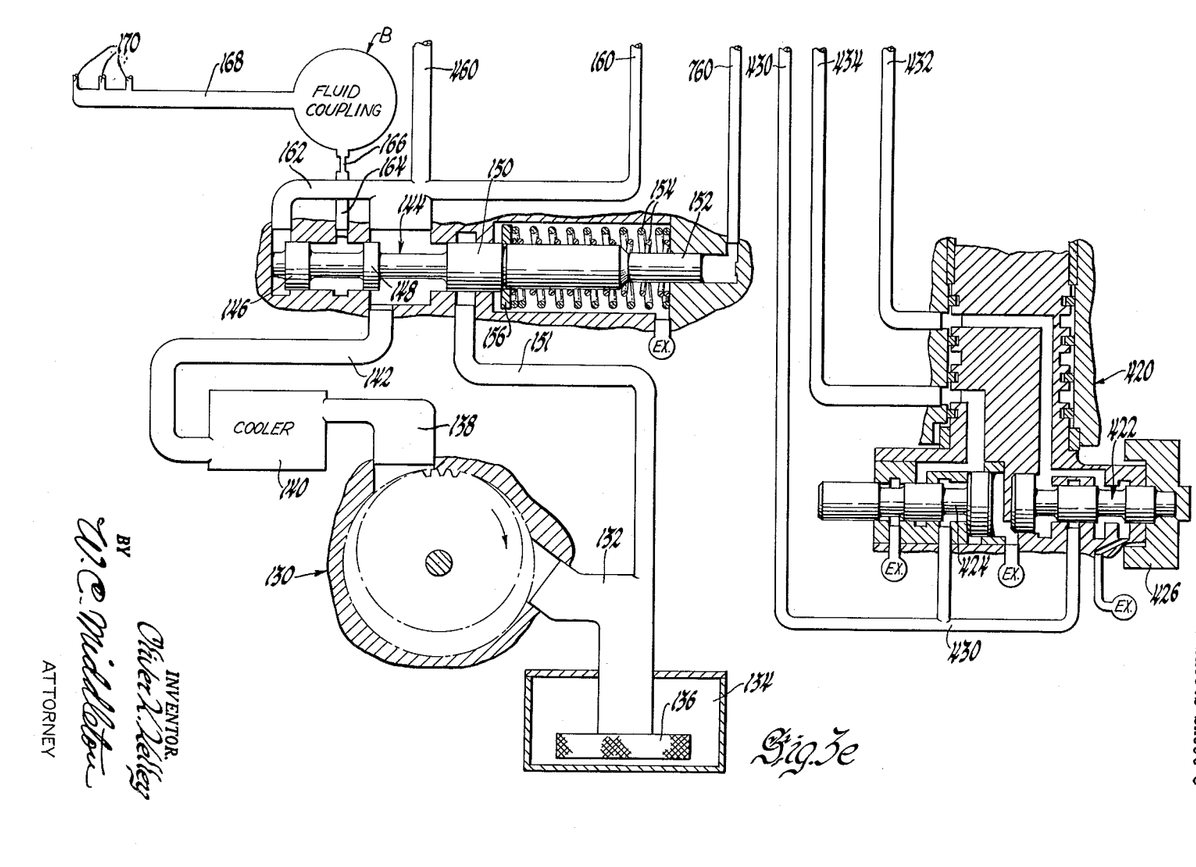
Figure 5C:
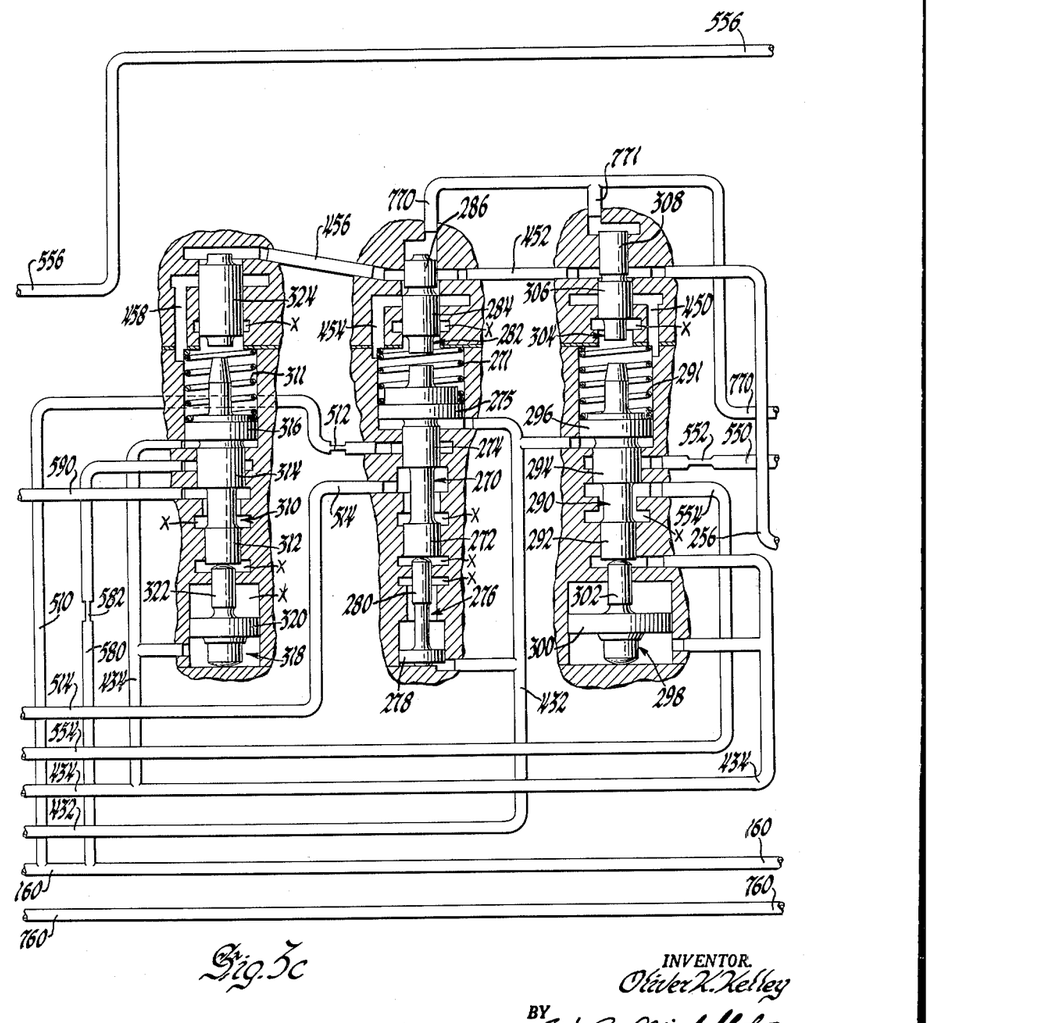

The hydraulic apparatus which functions to cause automatic operation of this transmission is depicted in detail in FIGURES 3a to 3e inclusive with the complete circuit diagram being traceable when these figures are arranged in the order shown in FIGURE 2.

The automatic operation of the transmission hereinbefore described is controlled by hydraulic pressure, the application of which to various parts of the mechanism is under the control of shift valves, orifice valves, and the like. Hydraulic pressure for operating the mechanism is supplied by a pump 130 of any suitable character driven by the input 10 for supplying the desired pressures. Pump 130 draws oil through a suction line 132 from a sump 134 through a screen 136. Oil is delivered by the pump 130 to a line 138 leading to a cooler 140 which may be a heat exchanger of any desired character. From the cooler 140 the oil passes through line 142 to a pressure regulator valve indicated generally at 144. The valve 144 is positioned to slide in a bore of a valve body and is provided with lands 146, 148 and 150. The stem 152 slides in a part of the bore of smaller diameter and the entire valve is biased to the left by springs 154 acting between an end wall of the major part of the bore and a snap ring 156 on the valve. Oil supplied by line 142 passes through the bore of the valve between the lands 148 and 150 to enter the main pump supply line 160 which serves to distribute oil through various passages, to be described later, to operating parts of the control mechanism. The regulation of valve 144 is accomplished in the following manner. Oil passing through the regulator valve and entering the line 160 has a portion thereof diverted by line 162 to the left end of land 146. When the pressure in line 160 and consequently applied by line 162 to the left end of the valve overcomes the resistance of springs 154 the entire valve is moved to the right. The initial movement in this direction causes land 148 to move far enough to permit oil from line 142 to enter the space between lands 146 and 148 and thence continue through line 164 and orifice 166 to the fluid coupling B. Oil exhausted by the coupling can pass through a line 168 which leads to various lubricating passages indicated at 170. Continued rise of pressure acting on the left end of land 146 of the regulator valve can move this valve far enough to the right against springs 154 to cause the land 150 to open the port connected to line 151, which extends to the sump or to the input of the pump 130. Opening of this port, therefore, relieves the pressure in the output of the regulator valve until this pressure is balanced by springs 154 at which time the port connected to line 151 will be closed. This regulating action continues with a substantially uniform delivered pressure throughout on forward drive ratios.

The main supply line 160 is extended to a manual valve indicated generally at 180. This valve is slidable in a bore in the valve body and is under the manual control of the operator of the vehicle through well known linkage which operates a crank 182 having a fork engaged between shoulders 184 on the end of the valve. The valve 180 is provided with lands 186, 188, 190 and 192. The body of the valve is provided with a number of ports connected to lines other than line 160 which will be described in detail later. The stem of the valve between lands 190 and 192 is provided with three depressions, 194, 196 and 198, which can be engaged by balls 200 springpressed toward the stem. These three grooves 194, 196 and 198 are determinative of the positions of the valve corresponding respectively to reverse, drive and neutral conditions of the transmission, which valve positions are indicated by the letters R, D and N.

One of the valves used in control of the apparatus comprises a throttle valve indicated generally at 204. This valve, which is slidable in a bore in the valve body, has lands 206 and 208. The valve 204 is biased to the left by a spring 210, one end of which is received in a slidable cup 212. Throttle valve 204 can be operated from a remote position by the following mechanism. A container 214 for oil or other suitable liquid has passing therethrough a shaft 216 which has secured thereto an arm 218 supporting at its other end a link 220, the lower end of which is ball shaped as at 222, and is socketed in a member 224 slidably fitting within a cup-shaped piston 226. The member 224 has opposite passages 228 therein and the bottom of member 224 is formed with a circular knife edge formation 230. Piston 226 is slidable in a cylinder 232 formed as a part of the case 214 and is biased upwardly by spring 234. To the lower end of the piston 226 is secured one end of a bellows 236, the other end of which is secured to a fitting 238 to which a pipe, or other conduit, 240 is attached. Communication between the interior of the bellows and the interior of the casing 214 is provided by an opening 242. The pipe 240 extends in sealed relation to a chamber 244, one end of which is sealed by an end of a bellows 246. The other end of the bellows is secured to a member 248 which has a stem 250 and a rod 252 bearing against the cup 212 of the throttle valve 204. Assuming that the remote control arrangement is in the position shown and that the bellows 236, the pipe 240 and the chamber 244 are filled with oil. If the shaft 216 is rocked as by a connection to the accelerator of the vehicle, the member 220 can be moved downwardly forcing the piston 226 also downwardly and displacing oil within the bellows 236. This oil must be accommodated in the chamber 244 with the result that the member 248 is moved to the left carrying the stem 252 therewith and moving cup 212 to the left. This movement compresses the spring 210 and has the effect of varying the pressure which will be regulated by the throttle valve 204. This valve receives oil from branch line 254 from main supply line 160, which line when the valve 204 is moved to the left, can enter the bore of the throttle valve and pass therethrough into the throttle valve line 256 to be distributed to shift valves in a manner to be described later. Oil from line 256 is diverted from the branch 258 to the left end of land 206 of the throttle valve so that when the pressure in line 256 is high enough to overcome the resistance of spring 210, the valve 204 will be moved to the right, first closing the port connected to line 254 and if the pressure is high enough, next opening a port connected to the exhaust passage 260. This regulating action, or metering action, continues with the pressure delivered in line 256 depending on the tension of spring 210 which is increased or decreased by movement of cup 212.

Movement of the column of oil with consequent movement of the member 248 and the stem 252 closely follows the throttle movement controlling the engine of the vehicle since as soon as pressure is released on the throttle the spring 234 forces the piston 226 upwardly to its full permissible extent as determined by throttle position. Movement of this piston upwardly with the fill opening 242 being closed causes the oil column to relieve the pressure exerted on member 248 so that the bellows 246 can expand as much as possible.

The openings 227 in the skirt of piston 226 provide communication between the opposite sides of the piston for the passage of oil during reciprocation of the piston. Likewise, the openings 228 in member 224 permit the passage of oil between opposite surfaces of member 224 in the event this member has motion beyond that of which the piston 226 is capable. The knife edge formation 230 on member 224 engaging the bottom of the piston, or a seal material thereon, prevents the escape of oil from the interior of bellows 236 when this bellows is compressed. In effect, a seal is provided for the fill opening 242 in the bottom of the piston.

Three shift valve trains are mounted in bores in the valve body, these bores having portions of different diameters to accommodate lands of different diameters on the parts of the valve trains. The first to second shift valve train is made up of a shift valve 270 having lands 272, 274, and 275. At one end of the valve 270 is a governor plug 276 having a large land 278 and a small stem portion 280. At the other end of the shift valve 270 is a throttle valve regulator plug 282 having lands 284 and 286. The bore of this valve train has ports therein to some of which are connected oil supply lines and others of which are connected to exhaust.

The second to third shift valve train is made up of a shift valve, a governor plug and a throttle regulator plug. The shift valve 290 has lands 292 and 294 of different diameters and a considerably larger land 296. The governor plug 298 has a large land 300 and a small stem portion 302. The throttle valve regulator plug 304 has lands 306 and 308 of different diameters. Again, the bore of this valve train is provided with ports for connection to oil lines or to exhaust.

The third to fourth shift valve train is made up of a third to fourth shift valve, a governor plug and throttle valve plug. The shift valve 310 has lands 312 and 314 of different diameters and a large land 316. The governor plug 318 has a large land 320 and a small stem 322. The throttle valve plug 324 is in the nature of a spool valve of uniform diameter throughout the major part of its length. Some of the ports in the bore of this valve train are connected to oil lines to be described later and some are connected to exhaust. The three shift valves 270, 290 and 310 are biased to the closed position by springs 271, 291 and 311, respectively.

Associated with clutch E is an orifice valve 321 having lands 323 and 325 spaced apart as shown. This valve is biased to the left by spring 326. Also associated with clutch E is an exhaust valve 330 having spaced lands 332, 334 and 336. A spring 338 biases this valve to the left as viewed in the drawing.

Clutch F has associated therewith an orifice valve 340 having spaced lands 342 and 344. This valve is biased to the right by spring 346.

An accumulator 350 is provided for storing a quantity of oil for cooling purposes for the clutch E. This accumulator is made up of a piston 352 slidable in a bore in the valve body and pressed downwardly by spring 354. A similar accumulator 356 has a piston 358 pressed downwardly by spring 360. Associated with accumulator 350 is a valve 362 having spaced lands 364 and 366. A spring 368 biases this valve in one position. A similar valve 370 is associated with accumulator 356 and has spaced lands 372 and 374. A spring 376 biases this valve to one of its positions. An accumulator 380 made up of a piston 382 slidable in a cylinder and pressed downwardly by spring 384 is provided for controlling the rate of engagement of clutch F. A similar accumulator 386 having a piston 388 slidable in a bore and pressed downwardly by spring 390 is provided for controlling the rate of engagement of brake G.

A servo 400 is provided for the brake band 100. This servo is so constructed as to provide two cylinder portions 402 and 404 with the walls of which parts 406 and 408 of piston 410 are in sliding engagement. The piston 410 has a spring 412 for biasing it downwardly. This piston has connected thereto in adjustable fashion a push rod 414 which acts on a crank member 416 utilized for applying and releasing the brake band 100 in well known fashion.

The controls also make use of a governor indicated generally at 420 which governor is made substantially in the manner illustrated and described in Thompson Patent 2,204,872. This governor in general comprises a rotatable valve body having two metering valves therein, one of which is subject to centrifugal force at a different rate from the other so that the pressure metered by the two valves increases at a different rate in relation to increase in speed of the output shaft 32 which drives the governor. Briefly, the two metering valves are identified at 422 and 424 with valve 422 having a weight 426 secured thereto so that its action in metering oil pressure is different from that of valve 424. The two valves 422 and 424 receive oil from a branch line 430 from main line 160 and act to meter pressure with that metered by valve 422 being delivered by line 432 to the shift valve trains and that metered by valve 424 being delivered by line 434 to various parts of the shift valve train.

Other valves and operating parts of the control mechanism will be described in the description of the operation of the system. It is to be understood that many ports are connected to exhaust and in each instance the connection has been marked EX or X.

*Neutral*

With the vehicle stationary, the manual valve 180 in neutral position, and power being supplied to the input shaft 10, the following actions occur. Rotation of shaft 10 drives the pump 130 which supplies oil from the sump through the cooler 140 to the regular valve 144 which operates to regulate a pressure in the order of 125 p.s.i. The regulated oil is delivered through the line 160 to various parts of the transmission. Neutral is established by movement of the manual valve to the neutral position which causes the oil in line 160 delivered to the manual valve to be arrested in the bore thereof between the lands 186 and 188. However, oil under pump pressure is delivered to the throttle valve 204 and such pump pressure is regulated or metered by this valve in accordance with throttle position and supplied to the shift valve trains. The line 256 from the throttle valve extends to a groove in the bore of the second to third throttle valve regulator plug 304 to act on the end surface of land 306 thereof. This causes the plug 304 to be moved downwardly and permits oil from line 256 to pass through passage 450 into the chamber of the spring 291 there to act on the end of the large land 296 of second to third shift valve 290. When the pressure in this chamber is sufficiently high, the plug 304 is moved upwardly closing the passage 450. Oil from the throttle valve continues from the groove in the second to third plug bore by way of passage 452 to a groove in the bore of the first to second regulator plug 282 to act on the differential area of land 284 to move it downwardly. This movement opens a passage 454 to the chamber of spring 271 so that this oil under pressure is applied to the end of the land 275 of first to second shift valve 270. When the pressure in this spring chamber is sufficiently high the plug 282 is moved upwardly closing the passage 454. Oil also passes from the first to second regulator plug bore through passage 456 to the end of the spool valve 324 to move it downwardly and open a passage 458 to the chamber of spring 311. Oil in this chamber acts on the land 316 and also when the pressure therein is high enough may move the spool valve 324 upwardly closing passage 458. The purpose of supplying oil under throttle valve pressure to the shift valve trains is to provide one factor determinative of the shift pattern, i.e., the time relative to vehicle speed at which shifts are automatically made.

As soon as the pump 130 delivers oil which is regulated by the regulator 144, the fluid coupling B is filled and in addition thereto oil proceeds by branch line 460 to continue through orifices 462 and 464 to the two accumulators 350 and 356. These accumulators are filled with oil which is prevented from being discharged therefrom by the two valves 362 and 370 which are normally in the position shown. In neutral, oil is also supplied to the governor through the branch line 430 but since the output shaft 32 is stationary, these two governor valves 422 and 424 are inactive to deliver metered pressures. Oil is also supplied through various branch lines, to be identified later, to the three shift valves which are in closed position thus arresting further progress of the oil. As before mentioned, the band 100 is released when the transmission is in neutral so that torque is not transmitted therethrough from the input shaft to the output shaft.

*Forward Drive—First Speed Ratio*

The transmission can be conditioned for forward drive by moving the manual valve from a neutral position to the drive position which is that illustrated in the drawings. As soon as this movement is completed, oil under pump pressure being supplied by line 160 to the bore of the manual valve between lands 186 and 188 can continue therefrom through the line 500 to the cylinder of the brake band servo to act on the exposed area of the part 406 of piston 410 to move said piston upwardly against the low resistance of spring 412 and thereby to move the push rod 414 and the arm 416 to the position shown in the drawing. This causes the brake band 100 to be tightly wrapped about the drum 36 to lock this drum and consequently ring gear 34 against rotation. Locking of ring gear 34 against rotation provides the reaction necessary for the transmission of torque through the gear sets to the output shaft 32. As soon as the pump 22 of coupling B has attained a speed which compels rotation of the turbine 24 of this coupling, the turbine will rotate and drive intermediate shaft 26 and sun gear 28. Such drive results in rotation of output shaft 32 at a reduction ratio determined by the ratio of the planetary gear set C. At this time the front planetary gear set A operates in direct drive as explained in connection with FIGURE 1. As soon as the output shaft 32 has rotation imparted thereto, the governor 420 begins operating with the delivery of two metered pressures thereby, the pressure in line 432 increasing more rapidly than the pressure in line 434.

*Shift First to Second*

The transmission will continue operating in first speed ratio until the pressure supplied by the governor through line 432 to the end of land 278 of governor plug 276 and the lower surface of land 275 of shift valve 270 is high enough to overcome the resistance of spring 271 and the fluid pressure in the spring chamber acting on the upper surface of land 275. Sufficient governor pressure will move the entire valve train from the closed position illustrated to a position in which oil supplied from line 160 through the branch 510 and restriction 512 can enter the bore of the shift valve 270 between lands 272 ad 274 and can continue therefrom through the line 514 to the bore of the clutch E exhaust valve 330. This valve at that time will be in the position shown so that oil can continue therefrom through the line 516 to a groove in the valve body surrounding the seat for ball valve member 518. This ball can be seated either by its own weight or by a light spring 520. Oil entering this groove will continue therefrom through restriction 521 to enter the line 84 which extends to the cylinder containing piston 82. However, accumulator action is desired for cushioning the engagement of clutch E by piston 82 and such is afforded by the ball valve member 524 which is seated either by its own weight or by a spring 526. The oil flowing to line 84 can lift ball 524 and enter the bottom of the accumulator 380 to lift the piston 382 thereof against spring 384. Simultaneously some of the oil in line 516 enters a branch channel 530 which directs oil through restriction 532 to the bore of the clutch E orifice valve 321 from which bore it can continue through branch line 534 to the clutch supply line 84. It will be seen therefore that oil is being supplied through two parallel channels and through two orifices 521 and 532 simultaneously to accelerate the engagement of clutch E, all however under the cushioning effect of the filling of the accumulator 380. When this accumulator has been substantially filled, full line pressure will be exerted for the final engagement of clutch E and for holding it engaged. Clutch E, during second speed operation, acts as a brake since it connects the sun gear 16 of planetary gear unit A to the drum 36 which is locked against rotation by brake band 100.

At the same time oil is supplied to line 516 from the clutch E exhaust valve 330, oil is also supplied through the branch line 540 to the right end of the cooling accumulator control valve 362. The oil so supplied acts on the right end of land 366 moving it to the left against spring 368 and connecting line 542 to the cooling feed line 114 of clutch E. As a result of the supply of oil from the accumulator 350 in this last mentioned connection of lines, oil is supplied to the plates 86 and 88 of clutch E and if these plates have surface grooves therein the oil can flow therebetween even after the plates are in surface contact. During the engagement of the plates, heat is generated but this cooling oil serves to absorb a considerable quantity of the heat and to convey it from the clutch through the exhaust opening 114 (FIGURE 1). The purpose of the accumulator is to assure a ready supply of a considerable volume of oil for cooling purposes without imposing an additional load on pump 130 and also without starving the remaining parts of the system of oil. Once the accumulator has completed its emptying stroke a smaller quantity of oil is steadily supplied to the line 114 by line 460 through the orifice 462 so long as the valve 362 remains in its open position. Engagement of clutch E, as before mentioned, locks the sun gear 16 against rotation causing the planetary gear unit A to operate in overdrive ratio and thereby imparting to the output shaft 32 the speed ratio which results from overdrive in unit A and reduction drive in unit C.

*Shift Second to Third*

The transmission will continue operating in second speed ratio until governor pressure applied to parts of the second to third shift valve train is high enough to overcome the resistance of spring 291 and the throttle valve pressure aiding this spring. Governor pressure from the governor metering valve 422 is supplied by line 432 to the lower surface of land 296 of second to third shift valve 290. At the same time governor pressure from the metering valve 424 of the governor is supplied through the line 434 to the lower surface of land 300 of governor plug 298 and the lower end surface of land 292 of the second to third shift valve 290. Upon attainment of sufficient governor pressure which is indicative of vehicle speed as correlated with throttle valve pressure indicative of throttle position, the entire second to third shift valve train will be moved upwardly (as viewed in the drawings) so that oil in line 550 branched from line 254 can continue through orifice 552 to the bore of the second to third shift valve 290 between lands 292 and 294 from which location it can continue through the line 554 to the bore of the clutch F orifice valve 340 which will at that time be in the illustrated position. From this bore the oil continues through the line 104 which extends to the cylinder containing piston 102 associated with clutch F. Some of the oil in line 104, however, is diverted through the branch passage 556 to the top of the cylinder 402 of the servo for brake 100. Oil entering this cylinder acts on the entire area of piston 410 forcing it downwardly against apply pressure delivered by line 500 to release the brake 100. This supply of oil to the servo and the action thereof in being forced downwardly serves an accumulator function for the engagement of clutch F and also serves to time the engagement of this clutch F relative to the release of brake 100. The various parts are so dimensioned and the supply of oil is so calibrated that the clutch is applied in such timed relation to the release of the brake as to prevent the interruption of torque transmission through the mechanism.

Simultaneously with the supply of oil through the line 544 from the second to third shift valve, oil is also directed through line 560 to the right end of the accumulator control valve 370 to act on land 374 thereof and to move this valve to the left against spring 376. Completion of such movement establishes connection between a line 562 from accumulator 356 and line 116 which extends to the clutch F in position to supply cooling oil from accumulator 356 to the clutch F during the engagement thereof. Accumulator 356 serves the same purpose as accumulator 350, i.e., providing a reservoir for sufficient volume of oil as may be necessary to cool the clutch elements during the engagement thereof. After the accumulator 356 has emptied, oil will still be supplied to the line 116 by line 460 and restriction 464. Line 554 has another branch line 570 which extends to the left end of the clutch E orifice valve 321 to act on land 323 thereof and to move this valve 321 to the right cutting communication between the line 530 and line 534. The purpose of this action will be explained in connection with a fourth to third downshift. A by-pass line 572 having restriction 574 therein connects branch line 570 and the clutch F supply line 104 for a purpose to be explained in connection with a forced fourth to second downshift.

*Shift Third to Fourth*

The transmission will continue operation in third speed ratio until output shaft speed and throttle position are such as to dictate a shift to fourth speed ratio. Oil from governor line 434 continues by line 435 to supply metered pressure from valve 424 to the lower surface of land 320 of governor plug 318 and the lower surface of the land 316 of third to fourth shift valve 310. When the proper conditions exist governor pressure acting on these two elements of the valve train will move the valve train to the open position at which time oil in branch line 580 from pump supply line 560 passes through the restriction 582 into the bore of the third to fourth shift valve between lands 312 and 314 thereof. From this bore the oil can continue through line 590 to the left end of clutch E exhaust valve 330 to move it to the right against spring 338. Completion of such movement connects a branch line 592 from line 590 through the bore of the exhaust valve between lands 332 and 334 to a line 594 which extends to a groove surrounding the seat for ball valve member 596 which is seated either by its own weight or by spring 598. From this groove the oil can continue through restriction 600 into the brake G supply line 124. Some of the oil in this line, however, acts to unseat ball valve member 602 against its own weight or the resistance of spring 604 to permit filling of the accumulator 386 so that cushioning of the engagement of brake G is accomplished. Engagement of brake G, however, does not occur until release of clutch E has been assured. The movement to the right of clutch E exhaust valve 330 connects the line 516 and its branch line 540 to the exhaust port 610 through the bore of the exhaust valve 330 between lands 334 and 336. With line 516 connected to exhaust, line 84, which has supplied oil to hold clutch E engaged, can be quickly exhausted since this oil will unseat the ball valve member 518 and continue rapidly to the exhaust port 610 thereby causing the release of clutch E at the proper time in relation to the engagement of brake G. The exhaust of the accumulator 380 which has been maintained filled until the third to fourth shift occurs is at a slower rate so as not to interfere with the exhaust of clutch E. The accumulator 380 must exhaust through a restriction 612 and the supply line 84 and such restriction is dimensioned so that oil from the accumulator will not interfere with the rapid release of clutch E. Exhaust of the line 540 which extends to the accumulator control valve 362 permits this valve to assume its closed position cutting off the supply of cooling oil to the clutch E.

The brake supply line 124 has a branch line 620 which extends to the left end of the accumulator control valve 370 so that this valve will have equal oil pressure at each end thereof and will be restored to its position by the spring valve 376. When the valve assumes its closed position the supply of cooling oil to the clutch F is interrupted since cooling ordinarily is no longer required, but accumulator 356 is again filled.

Engagement of brake G in timed relation to release of clutch E again locks the sun gear 16 against rotation so that the front unit A operates once more in an overdrive ratio while the rear unit C continues to operate in direct drive ratio.

Downshifts

A downshift from any speed ratio to the next speed ratio occurs as a result of a proper relation between governor pressure and throttle valve pressure acting on the valve train. Inasmuch as throttle valve pressure is cut off from each shift valve per se when this shift valve has been moved to the open position and throttle valve pressure is active only on the respective throttle valve plugs, a considerably lower governor pressure is required for movement of a shift valve from the open or upshifted position to the closed or downshift position. Furthermore, each of the shift valves makes use of differential areas for the lands between which the shift-inducing oil passes so that more pressure is exerted by this oil in a direction to hold the valve open than is directed in a direction to move the valve to closed position. For example, in shift valve 270, the lands 272 and 274, while appearing to be of equal diameter, are actually of different diameters. For example, valve 274 can be large enough to have an area subject to oil pressure on the lower end thereof which is of the order of .011 sq. in. greater than the area of land 272 subject to the same oil pressure. In valves 290 and 310 the difference in area between the lands 292 and 294 and lands 312 and 314 is appreciably greater than the differential areas of lands 272 and 274. Consequently, oil passing between the spaced lands exerts greater pressure to hold the valve in open position than that which would move the valves to closed position.

Fourth to Third Shift

When the relation between governor pressure acting on the third to fourth shift valve train and throttle valve pressure acting on the plug 324 thereof is such that governor pressure no longer can hold the valve in open position, it will be moved to the position illustrated. This immediately closes the port connected to the supply line 530 from main line 160 and opens the line 590 and those connected thereto to exhaust in the bore of the valve 310 between lands 312 and 314. Exhaust of line 590 removes pressure from the left end of land 332 of clutch E exhaust valve 330 so that spring 338 restores valve 330 to the illustrated position. This permits oil from the first to second shift valve in line 514 to continue through the exhaust valve 330 to lines 516 and 540 to cause engagement of the clutch E and the supply of cooling oil thereto in the manner described in connection with the first to second shift with one exception. The clutch E orifice valve 321 is in the closed position due to oil at the left end of land 323 thereof so that communication between branch line 530 and branch 534 through the bore of this valve is interrupted. Consequently the only passage for oil to the clutch is that by way of the ball valve 518 and restriction 521. This lessening of oil supply retards engagement of clutch E so that the inertia mass is given an opportunity to be effective in coming from rest to the speed of the carrier 12 of the front planetary unit A. Movement of the clutch E exhaust valve 330 to the left to the position shown in addition to reestablishing the supply of oil for engaging clutch E connects line 594 to exhaust at the port 595. As a result of this connection, oil in the line 124 and also in the branch 620 can be quickly exhausted since the ball 596 will be lifted from its seat permitting the oil from brake G and from the cooling accumulator valve 370 to be exhausted. Brake G therefore is released in timed relation to the application of clutch E. Accumulator 386 exhausts through restriction 605 at a rate slow enough not to interfere with the release of brake G. The inertia balance built into the transmission is therefore operative to lessen inertia jerks which might occur if clutch E should be engaged at any unduly rapid rate. The exhaust of line 590 and its connections, particularly the piston 122 of brake G, releases the sun gear 16 of planetary unit A in timed relation to the application of clutch E so that direct drive is once more established in planetary unit A while direct drive is maintained in planetary unit C.

The fourth to third shift may occur as a result of a closed throttle downshift, i.e., with the vehicle being brought to rest, or may occur within a range of vehicle speed by a movement of the vehicle throttle to full throttle position or to a position which will cause the development of throttle valve pressure high enough to move the third to fourth shift valve train in the manner just described.

Shift Third to Second

When the transmission is operating in third speed ratio and when the governor pressure supplied to the second to third shift valve train is no longer high enough to hold this valve train in the open position against the urging of spring 291 and whatever throttle valve pressure may be present, this entire train will be downshifted, with valve 270 closing the port connected to line 550 and connecting the line 554 to an exhaust port in the bore of the valve between lands 292 and 294. Exhaust of line 554 in a normal downshift causes release of clutch F with an attendant engagement of the brake band 100 by its servo. Oil in line 104 extending to the clutch F and in line 556 extending to the servo for band 100 can readily exhaust through the bore of the clutch F orifice valve 340 to the bore of the shift valve. Exhaust of oil from the upper surface of piston 410 of the servo while the maintained supply of oil to the lower surface of the skirt 406 thereof causes reengagement or reapplication of band 100 which produces a double transition in the gearing, i.e., changes the unit C from direct drive to reduction drive and changes the unit A from direct drive to overdrive.

The third to second shift may occur either as a closed throttle downshift in coming to rest; may occur with various throttle valve pressures with attendant decrease in governor pressure such as may be occasioned by the vehicle ascending a grade or may be induced by a wide or full throttle movement with high throttle valve pressure within a range of for example, three-fourths to full pressure.

Second to First Shift

When proper conditions of governor pressure, pressure by spring 271 or throttle valve pressure, occur the first to second shift valve train will be moved to the closed position closing the port connected to supply line 510 and connecting the delivery line 514 to exhaust between lands 272 and 274. This latter connection relieves the hydraulic pressure of clutch E permitting it to become released so that unit A is changed from overdrive to direct drive with a balancing of inertias and a reduction in inertia jerks.

Fourth to Second Shift

It is contemplated that if the vehicle is operating in fourth speed ratio and is moving at a speed below a predetermined maximum speed, movement of the throttle to wide open position may cause the development of such throttle valve pressure as will result in downshifting both the third to fourth shift valve train and the second to third shift valve train. In order that the transition will not occur too abruptly and in order that advantage may be taken of the balanced inertia phenomenon, provision is made for causing a delay in the release of clutch F and the application of brake band 100. Simultaneous downshift or closing of valves 290 and 310 causes exhaust of lines 554 and 590 and the branch lines connected thereto. Exhaust of line 590 permits the clutch E exhaust valve 330 to move to the right, or illustrated position, so that oil from valve 270 present in line 514 can continue in line 516 to enter line 84 through the orifice 521 and also oil from line 516 will continue through the branch 530 and orifice 532 to the clutch E orifice valve 321 which will then be in the position illustrated. This position of valve 321 is due to the exhaust of line 554 and line 570 connected thereto. Consequently, oil in the branch line 530 can continue through the bore of the valve 321, branch 534 into the clutch E supply line 84 providing two paths of travel for oil for the engagement of this clutch. Inasmuch as the brake band 100 must be applied and clutch F released for the establishment of second speed ratio, oil from the clutch F and from the servo 400 is initially exhausted through the lines 556 and 104 and the bore of the clutch F orifice valve 340. However, the supply of oil to the line 516 causes a branch supply through line 700 to the right end of land 344 of clutch F orifice valve 340 which will move this valve to the left so that land 344 closes the port connected to line 104. Oil from the clutch F and servo 400 must then be exhausted entirely through the branch line 572 and orifice 574 in parallel to the passage through the valve 340. The restriction 574 serves to retard the flow of oil from clutch F and servo 400 which delays the release of clutch F and the application of the band 100. Such delay, therefore permits the establishment momentarily of third speed ratio by the application of clutch E. As soon as this clutch becomes applied the pressure in line 84 is reflected in branch line 702 leading to the left of land 342 of the clutch F orifice valve 340 with a balancing of hydraulic pressures at the opposite ends of this valve so that spring 346 can restore the valve to the open or illustrated position. This permits a rapid completion of the exhaust of clutch F and the release pressure which has been applied to the servo 400. The momentary establishment of third speed ratio takes advantage of the balanced inertia properties of the present transmission both for establishing third speed ratio and then for establishing second speed ratio. Consequently, the transition from fourth speed ratio to second speed ratio is not as abrupt as would be the case if third speed ratio was not momentarily established.

*Reverse*

The transmission can be conditioned for reverse drive by movement of the manual valve 180 to the reverse position which permits pump pressure in line 160 to enter the bore of manual valve 180 between lands 188 and 190 from which bore it can continue by the line 54 and orifice 55 to the reverse cone brake H causing the piston 50 to move to the left gripping the conical extension 46 of ring gear 44 against the conical formation 48. In this fashion the ring gear 44 is locked against rotation which conditions the entire transmission for reverse drive in the manner before explained. Should the manual valve have been positioned in drive or illustrated position prior to the move to reverse position, oil in line 500, which serves to apply the servo 400, becomes exhausted by entry into the exhaust port connected to exhaust at 750. This connection assures the release of the brake band 100.

Inasmuch as higher pump pressure is desired for operation in reverse drive, a branch line 760 from reverse cone brake is extended to the left end of the pressure regulator valve 144 to act on the end of stem 152. This hydraulic pressure augments springs 154 so that a higher delivered pressure is metered by valve 144. This higher pressure may be in the order of 200 p.s.i.

It is further desirable that the transmission be incapable of up-shifting while operating in reverse and for this reason oil supplied from the manual valve to line 54 can continue in part through the line 770 to the shift valve body to enter a port connected to the top of the bore for the throttle valve regulator plug 282 to act on the upper surface of land 286 and through a branch 771 to the top of the bore of the throttle valve regulator plug 304 to act on the end surface of land 308 thereof. This increased line pressure forces the plugs 282 and 304 downwardly to the full extent and in the case of the plug 282 this complete downward movement causes the establishment of communication between line 770 and the passages 452 and 456. The higher oil pressure therefore can then continue through the channels 450, 454 and 458 into the chambers of the springs 291, 271 and 311 to act on the end areas of the lands 296, 275 and 316. Reverse pump pressure therefore is so great that governor pressure even at its maximum will not be high enough to cause upshifting of either of the three shift valves. The transmission will continue operating in reverse so long as the manual valve is maintained in reverse position.

The invention is capable of modification beyond the illustrated and described embodiment and therefore is to be limited only by the scope of the following claims.

I claim:

1. In a transmission, a power driven input, an output, a planetary gear unit having a driving element connected to said input, a driven element connected to drive said output, and a reaction element, said elements being connected to parts of said transmission, a predetermined reaction mass drive connected to said reaction element for rotation therewith at a speed of rotation greater than that of said reaction element, friction engaging means for holding said reaction element against rotation so that drive of said driving element causes drive of said driven element at a ratio other than direct drive, said reaction mass being inhibited against rotation when said reaction element is held against rotation, and friction engaging means for engaging said reaction element and another of said elements to rotate in unison, said engagement causing acceleration of said reaction element and said reaction mass and deceleration of the other element, the inertia of said elements and the parts of said transmission connected to each element being such that the inertia of the element and parts of said transmission being accelerated balances the inertia of the element and parts of the transmission being decelerated.

2. In a transmission, a power driven input, an output, a planetary gear unit having a driving element connected to said input, a driven element connected to drive said output, and a reaction element, said elements being connected to parts of said transmission, a predetermined reaction mass, a drive connection between said reaction mass and said reaction element, said connection causing said reaction mass to rotate faster than said reaction element, friction engaging means for holding said reaction element against rotation so that drive of said driving element causes drive of said driven element at a ratio other than direct drive, said reaction mass being inhibited against rotation when said reaction element is held against rotation, and friction engaging means for engaging said reaction element and another of said elements to rotate in unison, said engagement causing acceleration of said reaction element and said reaction mass and deceleration of the other element, the inertia of said elements and the parts of said transmission connected to each element being such that the inertia of the reaction element and the reaction mass being accelerated balances the inertia of the other element and parts rotating therewith being decelerated.

3. In a transmission, a power driven input, an output, a planetary gear unit having a driving element connected to said input, a driven element connected to drive said output, and a reaction element, said elements being connected to parts of said transmission, a predetermined reaction mass, an overdrive planetary gear unit having a carrier, said carrier being connected to be driven by said reaction elements, means for holding one element of said overdrive unit against rotation, the other element of said overdrive unit being connected to said reaction mass whereby said reaction mass rotates with and at a greater speed than said reaction element, friction engaging means for holding said reaction element against rotation so that drive of said driving element causes drive of said driven element at a ratio other than direct drive, said reaction mass being inhibited against rotation when said reaction element is held against rotation, and friction engaging means for engaging said reaction element and another of said elements to rotate in unison, said engagement causing acceleration of said reaction element and said reaction mass and deceleration of the other element, the inertia of said elements and the parts of said transmission connected to each element being such that the inertia of the reaction element and the reaction mass being accelerated balances the inertia of the other element and parts of the transmission rotating therewith being decelerated.

4. In a transmission, a power driven input, an output, a planetary gear unit having a driving element connected to said input, a driven element connected to drive said output, and a reaction element, said elements being connected to parts of said transmission, a brake for said reaction element for holding said reaction element against rotation so that drive of said driving element causes drive of said driven element at a ratio other than direct drive, and friction engaging clutch means for engaging said reaction element and another of said elements to rotate in unison, engagement of said clutch means causing acceleration of said reaction element and deceleration of the other elements, said reaction element having drive connected thereto for rotation therewith at overdrive ratio a reaction mass such that the accelerated inertia of said reaction element and reaction mass balances the decelerated inertia of said other elements and the masses of the transmission parts rotating therewith, said reaction mass being inhibited against rotation when said reaction element is held against rotation, engagement of said brake in timed relation to release of said clutch means causing deceleration of said reaction element and acceleration of the other elements with substantial balancing of the inertia of the parts accelerated and the inertia of the parts decelerated.

5. In a transmission, a power driven input, an output, a planetary gear unit having a driving element connected to said input, a driven element connected to drive said output, and a reaction element, said elements being connected to parts of said transmission, a brake for said reaction element for holding said reaction element against rotation so that drive of said driving element causes drive of said driven element at a ratio other than direct drive, and friction engaging clutch means for engaging said reaction element and another of said elements to rotate in unison, engagement of said clutch means causing acceleration of said reaction element and deceleration of the other elements, a reaction mass, an overdrive gear unit between said reaction mass and said reaction element for causing rotation of said reaction mass by said reaction element at an overdrive ratio when said reaction element is rotated, said reaction mass being inhibited against rotation when said reaction element is held against rotation, said reaction mass being such that the accelerated inertia of said reaction element and reaction mass balances the decelerated inertia of said other elements and the masses of the transmission parts rotating therewith, engagement of said brake in timed relation to release of said clutch means causing deceleration of said reaction element and acceleration of the other elements with substantial balancing of the inertia of the parts accelerated and the inertia of the parts decelerated.

6. In a transmission, a power driven input, an output, a planetary gear unit for completing the establishment of a plurality of speed ratios between said input and said output, said gear unit having a driving element connected to said input, a driven element and a reaction element, friction engaging means for holding said reaction element against rotation so that drive of said driving element causes drive of said driven element at a ratio other than direct drive, an inertia mass, an overdrive connection between one of said elements and said inertia mass for causing rotation of said inertia mass only when said one of said elements is rotated, and friction engaging means for engaging two of said elements to rotate in unison, said engagement causing acceleration and deceleration of gear unit elements and masses connected thereto, the inertia of the parts of the transmission being accelerated being balanced by the inertia of the parts of the transmission being decelerated.

7. In a transmission, a power driven input, an output, a planetary gear unit for completing the establishment of a plurality of speed ratios between said input and said output, said gear unit having a driving element connected to said input, a driven element and a reaction element, friction engaging means for holding said reaction element against rotation so that drive of said driving element causes drive of said driven element at a ratio other than direct drive, an inertia mass, a planetary overdrive gear unit connecting one of said elements to said inertia mass for causing rotation of said inertia mass at a higher speed only when one of said elements is rotated, and friction engaging means for engaging two of said elements to rotate in unison, said engagement causing acceleration and deceleration of gear unit elements and masses connected thereto, the inertia of the parts of the transmission being accelerated being balanced by the inertia of the parts of the transmission being decelerated.

8. In a transmission, a power driven input, an output, first and second planetary gear units between said input and said output, said first gear unit having a driving planet carrier connected to said input, a driven ring gear and a reaction sun gear, friction engaging means for holding said reaction element against rotation so that drive of said driving element causes drive of said driven element at a ratio other than direct drive, a hydrodynamic drive device having driving and driven members, said driving member being connected to the driven ring gear of the said first gear unit, said driven member being connected to a driving sun gear of said second gear unit, said second gear unit also having a reaction ring gear and a driven planet carrier, said driven planet carrier of the second unit being connected to said output, brake means for holding the reaction ring gear of said second unit against rotation, friction engaging means for connecting the reaction sun gear of the first unit to the reaction ring gear of the second unit whereby both reaction gears are held against rotation by the same brake means, and friction engaging means for causing the reaction gears of said units to be rotated in unison with the driven ring gear of the first unit when said brake means is released.

9. In a transmission, a power driven input having mass of predetermined inertia, an output, first and second planetary gear units between said input and said output, said first gear unit having a planet carrier connected to said input, a driven ring gear and a reaction sun gear, friction engaging means for holding said reaction element against rotation so that drive of said driving element causes drive of said driven element at a ratio other than direct drive, a predetermined reaction mass connected to be driven by said reaction sun gear at overdrive ratio only when said reaction sun gear is rotated, said driven ring gear being connected to drive a driving sun gear of said second gear unit, said second gear unit also having a reaction ring gear and a driven planet carrier, said driven planet carrier of the second unit being connected to said output, brake means for holding the reaction ring gear of said second unit against rotation to establish reduction drive in said second gear unit, first clutch means for connecting the reaction sun gear of the first unit to the reaction ring gear of the second unit whereby both reaction gears are held against rotation by the same brake means to establish overdrive in said first gear unit while reduction drive in said second gear unit is maintained, and second clutch means for causing the reaction gears of said units to be rotated in unison with the driven ring gear of the first unit when said brake means is released, application of said second clutch causing acceleration of the reaction sun gear of said first gear unit and said reaction mass and deceleration of said driven ring gear of said first gear unit at one rate and deceleration of said carrier and input mass at a different rate, said masses having such inertias that the inertia of decelerating masses is balanced by the inertia of accelerating masses.

References Cited in the file of this patent

UNITED STATES PATENTS

| | | |
|---|---|---|
| 2,527,820 | Johnson et al. | Oct. 31, 1950 |
| 2,530,200 | Hobbs | Nov. 14, 1950 |
| 2,664,016 | De Normanville | Dec. 29, 1953 |
| 2,736,215 | Swift | Feb. 28, 1956 |
| 2,854,862 | Foerster | Oct. 7, 1958 |

FOREIGN PATENTS

| | | |
|---|---|---|
| 1,051,228 | France | Sept. 9, 1953 |

UNITED STATES PATENT OFFICE
CERTIFICATE OF CORRECTION

Patent No. 3,027,783                                                              April 3, 1962

Oliver K. Kelley

It is hereby certified that error appears in the above numbered patent requiring correction and that the said Letters Patent should read as corrected below.

Column 2, line 42, for "engines" read -- engine --; column 10, line 44, for "ad" read -- and --; column 13, line 74, for "any" read -- an --; column 16, lines 22, 44 and 67, before "reaction", each occurrence, insert -- predetermined --; lines 23, 45 and 68, strike out "predetermined", each occurrence; column 18, line 23, after "when" insert -- said --.

Signed and sealed this 7th day of April 1964.

(SEAL)
Attest:

ERNEST W. SWIDER
Attesting Officer

EDWARD J. BRENNER

Commissioner of Patents